US012746731B2

(12) United States Patent
Plummer et al.

(10) Patent No.: US 12,746,731 B2
(45) Date of Patent: Sep. 29, 2026

(54) COMPOSITE FORMING

(71) Applicant: The Boeing Company, Arlington, VA (US)

(72) Inventors: Steven Joseph Plummer, Seattle, WA (US); Brian Gregory Robins, Renton, WA (US); Kurtis Shuldberg Willden, Kent, WA (US)

(73) Assignee: The Boeing Company, Arlington, VA (US)

( * ) Notice: Subject to any disclaimer, the term of this patent is extended or adjusted under 35 U.S.C. 154(b) by 262 days.

(21) Appl. No.: 18/585,654

(22) Filed: Feb. 23, 2024

(65) Prior Publication Data

US 2025/0269616 A1 Aug. 28, 2025

(51) Int. Cl.
*B29C 70/44* (2006.01)
*B29C 35/04* (2006.01)
*B29L 31/30* (2006.01)

(52) U.S. Cl.
CPC .......... *B29C 70/443* (2013.01); *B29C 35/045* (2013.01); *B29L 2031/3076* (2013.01)

(58) Field of Classification Search
CPC ..... B29C 70/44; B29C 70/465; B29C 70/542; B29C 2043/3644
See application file for complete search history.

(56) References Cited

U.S. PATENT DOCUMENTS 3,492,392 A * 1/1970 Noriyoshi ........... B29C 37/0064 156/247
3,608,055 A * 9/1971 Long ....................... B29C 51/28 264/316
4,695,344 A * 9/1987 Crane ...................... B29C 70/44 156/289
4,943,222 A * 7/1990 Nathoo ..................... B28B 7/12 425/395
5,151,277 A * 9/1992 Bernardon ............ B29C 70/443 249/161
5,156,795 A * 10/1992 Harvey ................. B29C 70/542 264/510
5,322,665 A * 6/1994 Bernardon ............. B29C 70/44 264/316
6,814,916 B2 11/2004 Willden et al.
7,118,370 B2 10/2006 Willden et al.
7,651,650 B2 1/2010 Willden et al.
8,142,181 B2 3/2012 Willden et al.
8,236,222 B2 8/2012 Henderson et al.
10,189,209 B2 * 1/2019 Downs .................. B29C 66/438
10,239,251 B2 3/2019 Deck et al.
10,336,014 B2 7/2019 Stawski et al.
10,399,284 B2 * 9/2019 Prause .................... B29C 70/34
10,688,697 B2 6/2020 Sundquist et al.
(Continued)

OTHER PUBLICATIONS

Extended European Search Report, dated Jun. 11, 2025, regarding EP Application No. 25158856.2, 8 pages.

*Primary Examiner* — Matthew J Daniels
(74) *Attorney, Agent, or Firm* — Yee & Associates, P.C.

(57) ABSTRACT

Methods of creating a formed shape into composite layups with reduced wrinkling. A composite layup is sealed in a vacuum envelope, the composite layup comprising at least one of a resin or a thermoplastic material. The composite layup is formed onto a tool while the composite layup is held under vacuum in the vacuum envelope to create a formed shape in the composite layup.

25 Claims, 9 Drawing Sheets

(56) References Cited

U.S. PATENT DOCUMENTS

| | | | | |
|---|---|---|---|---|
| 2004/0043196 | A1* | 3/2004 | Willden | B29C 43/18<br>428/174 |
| 2005/0257887 | A1* | 11/2005 | Tsotsis | B29B 11/16<br>156/308.2 |
| 2007/0063378 | A1* | 3/2007 | O'Donoghue | B29C 33/40<br>425/406 |
| 2011/0014315 | A1* | 1/2011 | Okoli | B29C 70/086<br>425/129.1 |
| 2013/0157057 | A1* | 6/2013 | Haffelin | B29C 70/542<br>428/421 |
| 2013/0340944 | A1 | 12/2013 | Modin | |
| 2019/0016063 | A1 | 1/2019 | Newton et al. | |
| 2020/0009805 | A1* | 1/2020 | Wybrow | B32B 27/12 |
| 2020/0047455 | A1* | 2/2020 | Guha | B32B 5/12 |
| 2020/0070385 | A1* | 3/2020 | Sekine | B29B 11/16 |
| 2021/0101349 | A1 | 4/2021 | Lockett et al. | |
| 2021/0206125 | A1 | 7/2021 | Scarfe et al. | |
| 2023/0063490 | A1 | 3/2023 | Willden et al. | |

* cited by examiner

COMPOSITE FORMING

BACKGROUND INFORMATION

1. Field

The present disclosure relates generally to composite forming and more specifically to methods of forming composites with reduced wrinkling.

2. Background

Dry carbon fabrics can be used for resin infusion applications. Dry carbon fabrics are often formed into a part shape before infusion and cure. Due to the bulk of dry composite fabrics, the types of tooling may be limited. Inconsistencies such as wrinkles can be generated during some methods of forming.

Other materials, including non-crimped fabric (NCF) and unidirectional prepreg laminates also go through shaping applications. It is desirable to reduce inconsistencies during methods of forming.

Therefore, it would be desirable to have a method and apparatus that takes into account at least some of the issues discussed above, as well as other possible issues. For example, it would be desirable to present additional methods of forming dry composite fabrics. Additionally, it would be desirable to reduce or prevent wrinkles while forming composite materials.

SUMMARY

An embodiment of the present disclosure provides a method of forming a composite structure. A composite layup is sealed in a vacuum envelope, the composite layup comprising at least one of a resin or a thermoplastic material. The composite layup is formed onto a tool while the composite layup is held under vacuum in the vacuum envelope to create a formed shape in the composite layup.

Another embodiment of the present disclosure provides a method of shaping a composite layup with reduced wrinkles. A composite layup is debulked in a vacuum envelope. The composite layup is formed onto a tool while the composite layup is under vacuum within the vacuum envelope to create a formed shape in the composite layup. The composite layup is processed while in the formed shape.

A further embodiment of the present disclosure provides a method of forming a composite layup. A composite layup under vacuum within a vacuum envelope is loaded into a forming machine. The composite layup under vacuum within the vacuum envelope is swept against a tool using sweepers of the forming machine.

A yet further embodiment of the present disclosure provides a method of forming a composite layup. Layers of material are laid up to form a composite layup, the composite layup comprising at least one of a resin or a thermoplastic material. The composite layup is debulked by applying vacuum within a vacuum envelope prior to the forming. The composite layup is formed onto a tool while the composite layup is under vacuum within the vacuum envelope to create a formed shape in the composite layup. The composite layup is heated while under vacuum to maintain the formed shape in the composite layup by tacking the composite layup.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

Figure 1:
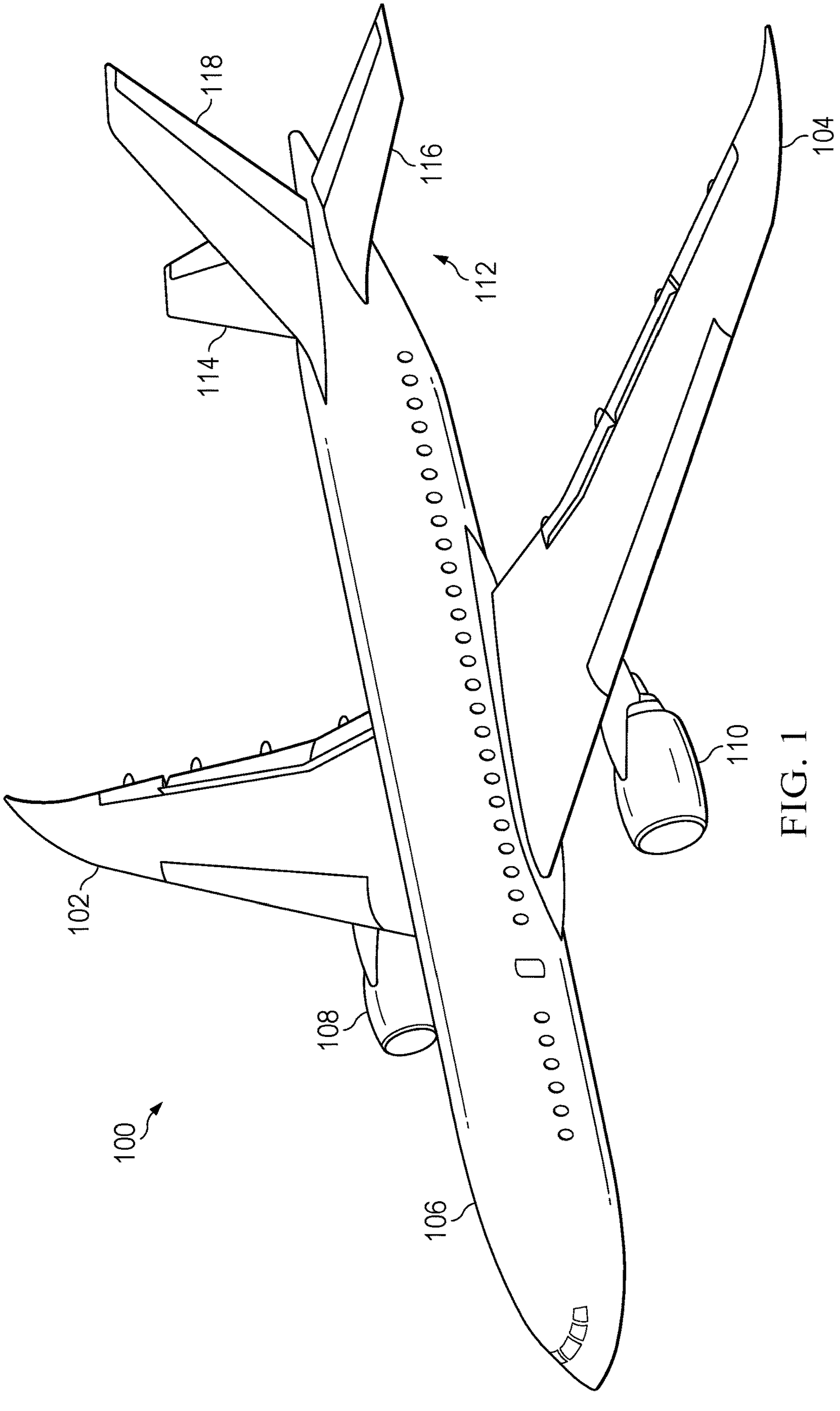
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have composite components shaped using the illustrative examples. A portion of at least one of wing 102, wing 104, body 106, horizontal stabilizer 114, horizontal stabilizer 116, or vertical stabilizer 118 can be manufactured using the illustrative examples. In some illustrative examples, a stiffener of at least one of wing 102, wing 104, body 106, horizontal stabilizer 114, horizontal stabilizer 116, or vertical stabilizer 118 can be manufactured using the illustrative examples.

Figure 2:
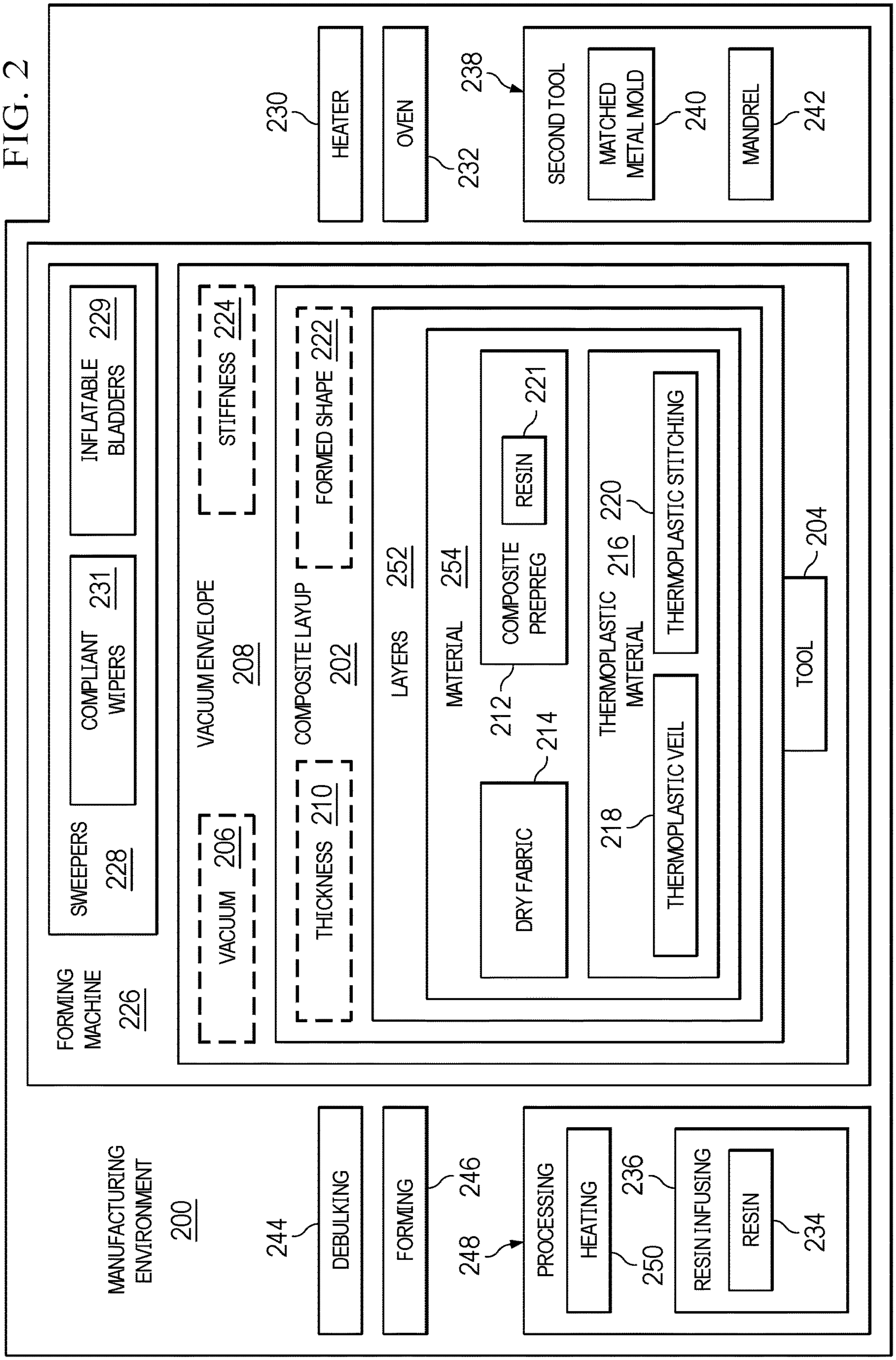
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. A portion of aircraft 100 of FIG. 1 can be manufactured in manufacturing environment 200. Composite layup 202 can be formed against tool 204 in manufacturing environment 200.

Composite layup 202 is debulked prior to forming composite layup 202 on tool 204. Debulking 244 composite layup 202 prior to forming 246 is performed by applying vacuum 206 within vacuum envelope 208 prior to forming 246. Vacuum envelope 208 is formed of an impermeable material such as a vacuum bag. To debulk composite layup 202, vacuum 206 is applied to composite layup 202. To apply vacuum 206 to composite layup 202, composite layup 202 is sealed in vacuum envelope 208. In some illustrative examples, by applying vacuum 206 to composite layup 202 in vacuum envelope 208, thickness 210 of composite layup 202 is reduced.

Composite layup 202 can take any desirable form. Composite layup 202 comprises layers 252 of material 254. Material 254 can take the form of either composite prepreg 212 or dry fabric 214. Layers 252 of material are laid up to form composite layup 202. In some illustrative examples, composite layup 202 is substantially flat.

Composite layup 202 comprises at least one of resin 221 or thermoplastic material 216. Thermoplastic material 216 can be present with dry fabric 214 or composite prepreg 212. In some illustrative examples, thermoplastic material 216 takes the form of at least one of thermoplastic veil 218 or a thermoplastic stitching 220. In these illustrative examples, resin 221 is part of composite prepreg 212. In some illustrative examples, composite layup 202 comprises one of a dry fabric 214 preform or a laminate formed of composite prepreg 212. A dry fabric 214 preform is non-impregnated. In some illustrative examples, composite layup 202 comprises composite prepreg 212. In some illustrative examples, composite layup 202 comprises dry fabric 214. In some illustrative examples, composite layup 202 comprises thermoplastic material 216. In some illustrative examples, thermoplastic material 216 comprises one of thermoplastic veil 218 or thermoplastic stitching 220. In some illustrative examples, one of thermoplastic veil 218 or thermoplastic stitching 220 is used with dry fabric 214 to form composite layup 202.

Composite layup 202 is formed onto tool 204 while composite layup 202 is held under vacuum 206 in vacuum envelope 208. Forming 246 composite layup 202 onto tool 204 creates formed shape 222 in composite layup 202. By forming composite layup 202 onto tool 204 while composite layup 202 is held under vacuum 206, wrinkles are reduced.

Tool 204 can have any desirable cross-sectional shape. In some illustrative examples, tool 204 has a planar surface. In some illustrative examples, tool 204 can have a bend, kink, curve, or other type of change in direction. In some illustrative examples, vacuum envelope 208 can stretch to accommodate a bend, kink, cure, or other type of feature in tool 204.

In some illustrative examples, forming machine 226 is used to sweep composite layup 202 onto tool 204 to form composite layup 202 onto tool 204. In some illustrative examples, sweepers 228 of forming machine 226 sweep composite layup 202 onto tool 204. In some illustrative examples, composite layup 202 sealed in vacuum envelope 208 is loaded into forming machine 226, and composite layup 202 is formed onto tool 204 by sweeping composite layup 202 onto tool 204 by forming machine 226.

In some illustrative examples, sweepers 228 can take the form of inflatable bladders 229 or compliant wipers 231. In some illustrative examples, compliant wipers 231 can take the form of fingers, squeegees, or any other desirable form of sweeper. Sweepers 228 are configured to press composite layup 202 sealed in vacuum envelope 208 against tool 204. Pressing composite layup 202 against tool 204 changes the shape of composite layup 202 to create formed shape 222 in composite layup 202.

Inflatable bladders 229 can be filled with any desirable type of material. Inflatable bladders 229 can be filled with at least one of air, a different gas, a fluid, a gel, a polymer, or any other desirable material. In some illustrative examples, silicone is within inflatable bladders 229.

In some illustrative examples, pressure applied by sweepers 228 applies an elevated pressure to composite layup 202 during forming 246. The elevated pressure during forming 246 controls wrinkles and bulk.

In some illustrative examples, a level of vacuum 206 in vacuum envelope 208 during forming 246 of composite layup 202 onto tool 204 to control forming 246 of composite layup 202. By controlling the level of vacuum 206 in vacuum envelope 208, stiffness 224 of composite layup 202 in vacuum envelope 208 can be controlled. By increasing vacuum 206, stiffness 224 of composite layup 202 in vacuum envelope 208 can be increased. By decreasing vacuum 206, stiffness 224 of composite layup 202 in vacuum envelope 208 can be decreased. In some illustrative examples, vacuum 206 is decreased to decrease stiffness 224 to more easily form composite layup 202 against tool 204. In some illustrative examples, reducing stiffness 224 can allow for more slippage of layers of composite layup 202 relative to each other.

After forming 246, processing 248 is performed on composite layup 202. In some illustrative examples, processing 248 is performed on composite layup 202 in vacuum envelope 208. Processing 248 includes additional steps for manufacturing. Processing 248 can include at least one of heating 250 or resin infusing 236.

In some illustrative examples, composite layup 202 is heated while under vacuum 206 to maintain formed shape 222 in composite layup 202. In some illustrative examples, heating 250 composite layup 202 at least one of melts or softens thermoplastic material 216. In some illustrative examples, thermoplastic material 216 is at least softened to tack composite layup 202.

In some illustrative examples, composite layup 202 is formed of dry fabric 214 and heating 250 is performed prior to removing composite layup 202 from vacuum envelope 208. In some illustrative examples, composite layup 202 is formed of composite prepreg 212 and composite layup 202 is removed from vacuum envelope 208 without heating 250.

In some illustrative examples, heating 250 composite layup 202 comprises melting at least one of thermoplastic veil 218 or thermoplastic stitching 220 in composite layup 202. In some illustrative examples, melting at least one of thermoplastic veil 218 or thermoplastic stitching 220 holds composite layup 202 together. In some illustrative examples, thermoplastic veil 218 stiffens composite layup 202. In some illustrative examples, thermoplastic stitching 220 provides tack and keeps composite layup 202 together.

In some illustrative examples, heating 250 composite layup 202 comprises heating 250 composite layup 202 on tool 204 in oven 232. In some illustrative examples, heating 250 composite layup 202 comprises applying directed heat onto composite layup 202 while sweepers 228 of forming machine 226 compress composite layup 202 against tool 204. In some illustrative examples, heating 250 composite layup 202 comprises applying directed heat using heater 230. In some illustrative examples, heater 230 can comprise at least one of blowers, conductive heaters in tool 204, or any other type of directed heater. In some illustrative examples, heater 230 comprises heating elements integral to one of forming machine 226 or tool 204. In some illustrative examples, composite layup 202 is heated by blowers or other types of heater 230 movable relative to forming machine 226.

In some illustrative examples, composite layup 202 in vacuum envelope 208 with formed shape 222 is placed at least one of onto or into second tool 238 prior to heating 250 composite layup 202. In some illustrative examples, composite layup 202 in vacuum envelope 208 is placed into matched metal mold 240 prior to heating 250 composite layup 202. In some illustrative examples, composite layup 202 in vacuum envelope 208 is placed onto mandrel 242 prior to heating 250 composite layup 202. In other illustrative examples, heating 250 composite layup 202 is performed prior to removing composite layup 202 from vacuum envelope 208.

In some illustrative examples, after removing composite layup 202 with formed shape 222 from vacuum envelope 208, composite layup 202 with formed shape 222 is placed at least one of into or onto second tool 238. In some illustrative examples, second tool 238 can take the form of one of matched metal mold 240 or mandrel 242.

In some illustrative examples, vacuum envelope 208 is sealed against tool 204. In some illustrative examples, resin infusing 236 is performed with vacuum envelope 208 sealed against tool 204. In some illustrative examples, resin 234 is infused into composite layup 202 while vacuum envelope 208 is sealed against tool 204. In some illustrative examples, resin infusing 236 composite layup 202 is performed within vacuum envelope 208. In other illustrative examples, resin infusing 236 can be performed on composite layup 202 with formed shape 222 outside of vacuum envelope 208. In some illustrative examples, resin infusing 236 can be performed on composite layup 202 in matched metal mold 240.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
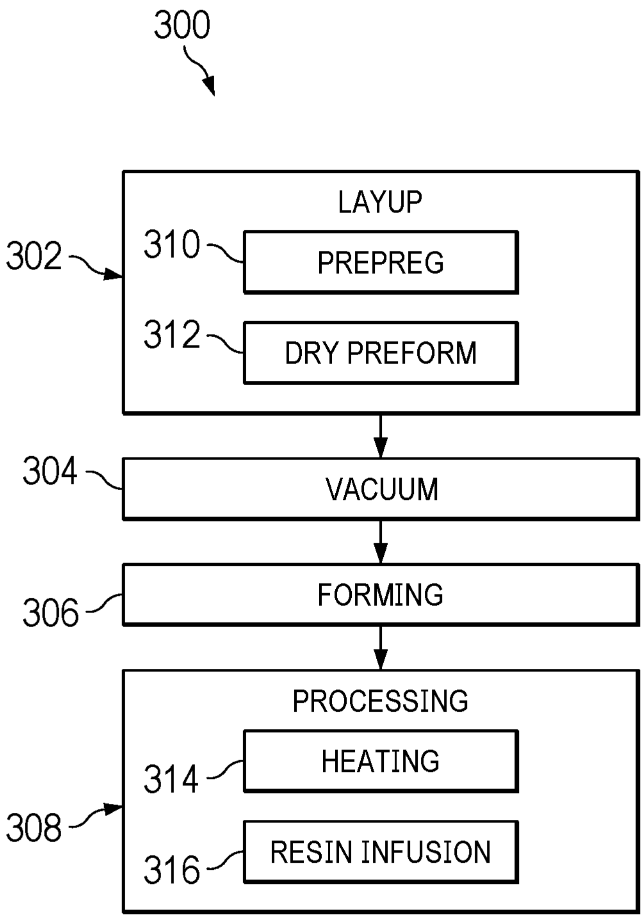
FIG. 3 is a flowchart of steps of forming composite layup in accordance with an illustrative embodiment.

Turning now to FIG. 3, a flowchart of steps of forming composite layup is depicted in accordance with an illustrative embodiment. Flowchart 300 can be implemented in manufacturing environment 200 of FIG. 2. Flowchart 300 can be implemented to form a composite part of aircraft 100 of FIG. 1.

In step 302, layup of a composite layup is performed. The composite layup comprises one of prepreg 310 or dry preform 312. In step 304, vacuum is applied to the composite layup to debulk the composite layup.

While applying vacuum to the composite layup, the composite layup is formed in step 306. The composite layup is formed by shaping the composite layup onto a tool. Forming the composite layup to the tool creates a formed shape in the composite layup. Forming the composite layup while the composite layup is under vacuum applies an elevated pressure that can be used to control wrinkles and bulk of the composite layup.

After forming in step 306, the composite layup undergoes processing in step 308. In some illustrative examples, at least one processing procedure can be completed with the composite layup within the vacuum envelope. In some illustrative examples, at least one procedure of step 308 is performed with the composite layup outside of the vacuum envelope. In some illustrative examples, processing in step 308 comprises at least one of heating 314 or resin infusion 316. In other illustrative examples, step 308 includes placing the composite layup at least one of into or onto a second tool.

Figure 4:
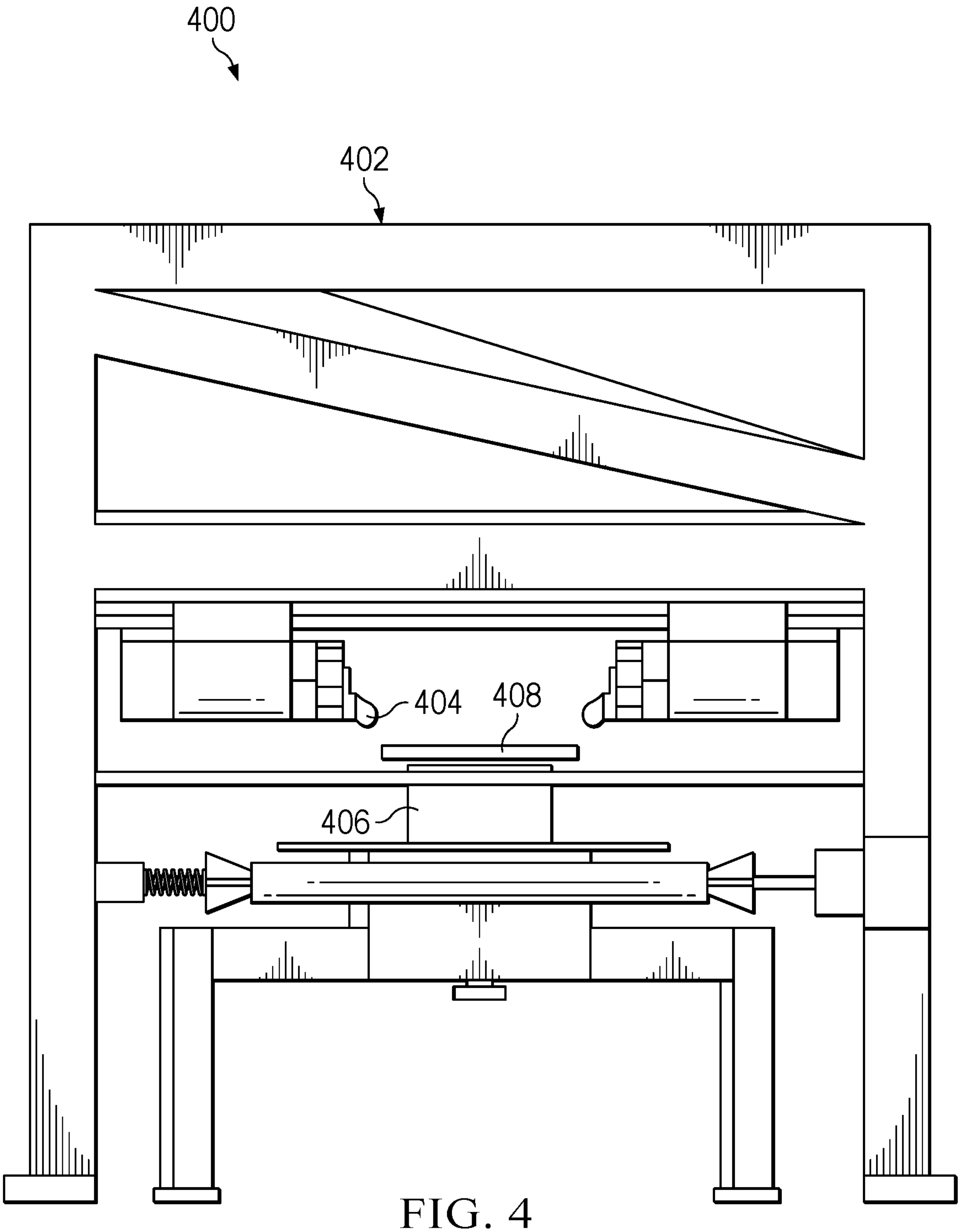
FIG. 4 is a front view of a composite layup sealed in a vacuum envelope within a forming machine in accordance with an illustrative embodiment.

Turning now to FIG. 4, a front view of a composite layup sealed in a vacuum envelope within a forming machine is depicted in accordance with an illustrative embodiment. In view 400 of forming machine 402, composite layup 408 sealed in a vacuum envelope has been loaded into forming machine 402. Forming machine 402 is a physical implementation of forming machine 226 of FIG. 2. Forming machine 402 forms composite layup 408 sealed in the vacuum envelope onto tool 406 using sweepers 404. In this illustrative example, sweepers 404 take the form of inflatable bladders. In other illustrative examples, sweepers 404 can take the form of compliant wipers such as fingers, squeegees, or any other desirable form of sweeper. Sweepers 404 are configured to press composite layup 408 sealed in the vacuum envelope against tool 406. Pressing composite layup 408 against tool 406 changes the shape of composite layup 408 to create a formed shape in composite layup 408.

Figure 5:
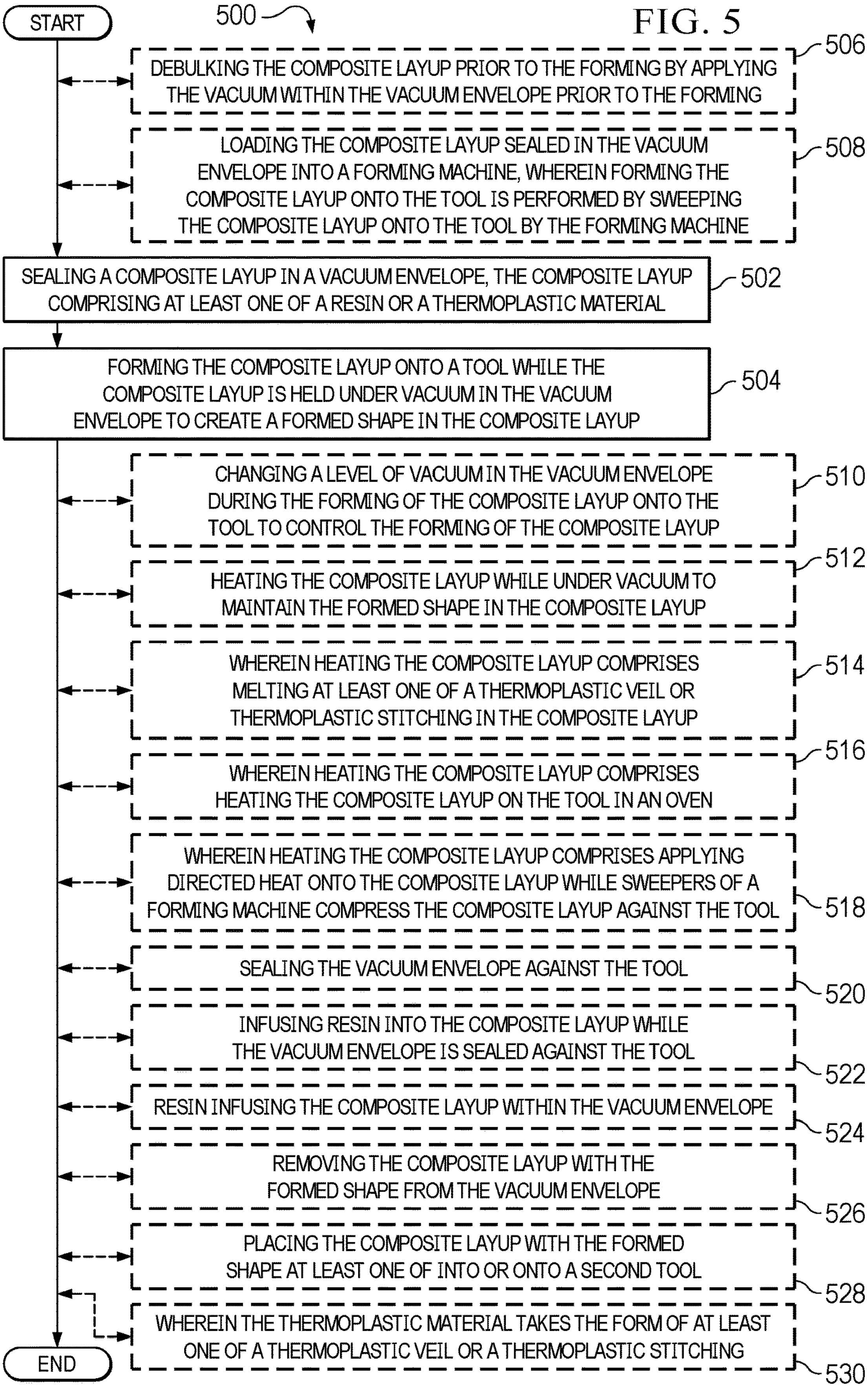
FIG. 5 is a flowchart of a method of forming a composite structure in accordance with an illustrative embodiment.

Turning now to FIG. 5, a flowchart of a method of forming a composite structure is depicted in accordance with an illustrative embodiment. Method 500 can be performed to create a composite component of aircraft 100. Method 500 can be performed on composite layup 202 in vacuum envelope 208 of FIG. 2. Method 500 can be a method comprising steps of flowchart 300 of FIG. 3. Method 500 can be performed using forming machine 402 of FIG. 4.

Method 500 seals a composite layup in a vacuum envelope, the composite layup comprising at least one of a resin or a thermoplastic material (operation 502). Method 500 forms the composite layup onto a tool while the composite layup is held under vacuum in the vacuum envelope to create a formed shape in the composite layup (operation 504). Afterwards, method 500 terminates.

In some illustrative examples, method 500 debulks the composite layup prior to the forming by applying the vacuum within the vacuum envelope prior to the forming (operation 506). In some illustrative examples, by applying the vacuum within the vacuum envelope, a thickness of the composite layup is reduced.

In some illustrative examples, method 500 loads the composite layup sealed in the vacuum envelope into a forming machine, wherein forming the composite layup onto the tool is performed by sweeping the composite layup onto the tool by the forming machine (operation 508). The forming machine can comprise any desirable type of sweepers. In some illustrative examples, the sweepers of the forming machine comprise at least one of inflatable bladders or compliant wipers. Compliant wipers can take the form of fingers, squeegees, or any other desirable type of sweeper.

In some illustrative examples, method 500 changes a level of vacuum in the vacuum envelope during the forming of the composite layup onto the tool to control the forming of the composite layup (operation 510). In some illustrative examples, changing a level of vacuum in the vacuum envelope changes a stiffness of the composite layup and vacuum envelope. In some illustrative examples, the composite layup has a greater stiffness when a greater vacuum is applied to the composite layup. In some illustrative examples, the vacuum is lowered to lower the stiffness of the composite layup at some portions of the forming.

In some illustrative examples, method 500 heats the composite layup while under vacuum to maintain the formed shape in the composite layup (operation 512). In some illustrative examples, heating the composite layup takes place in an oven. In some illustrative examples, heating the composite layup is performed by a directed heat source.

In some illustrative examples, heating the composite layup comprises melting at least one of a thermoplastic veil or thermoplastic stitching in the composite layup (operation 514). In some illustrative examples, melting at least one of the thermoplastic veil or thermoplastic stitching holds the composite layup together. In some illustrative examples, the thermoplastic veil stiffens the material. In some illustrative examples, the thermoplastic stitching provides tack and keeps the composite layup together.

In some illustrative examples, heating the composite layup comprises heating the composite layup on the tool in an oven (operation 516). In these illustrative examples, the tool and the composite layup can be moved into an oven. In some of these illustrative examples, the vacuum envelope is sealed against the tool prior to heating.

In some illustrative examples, heating the composite layup comprises applying directed heat onto the composite layup while sweepers of a forming machine compress the composite layup against the tool (operation 518). In some illustrative examples, the directed heat can comprise at least one of infra-red heaters above and/or below the layup, inductive heaters above and/or below the layup, inductive heating in the tool, blowers, conductive heaters in the tool, or any other type of directed heater.

In some illustrative examples, method 500 seals the vacuum envelope against the tool (operation 520). In some illustrative examples, method 500 infuses resin into the composite layup while the vacuum envelope is sealed against the tool (operation 522).

In some illustrative examples, method 500 resin infuses the composite layup within the vacuum envelope (operation 524). Any desirable equipment can be used to perform the resin infusion. In some illustrative examples, additional tooling or an additional vacuum bag can be placed around the vacuum envelope.

In some illustrative examples, method 500 removes the composite layup with the formed shape from the vacuum envelope (operation 526). In some illustrative examples, the composite layup with the formed shape is removed from the vacuum envelope after heat treatment. In some illustrative examples, the composite layup with the formed shape is removed from the vacuum envelope prior to a heat treatment.

In some illustrative examples, method 500 places the composite layup with the formed shape at least one of into or onto a second tool (operation 528). In some illustrative examples, the second tool takes the form of a matched metal mold. In some illustrative examples, the second tool takes the form of a second mandrel. In some illustrative examples, the thermoplastic material takes the form of at least one of a thermoplastic veil or a thermoplastic stitching (operation 530).

Figure 6:
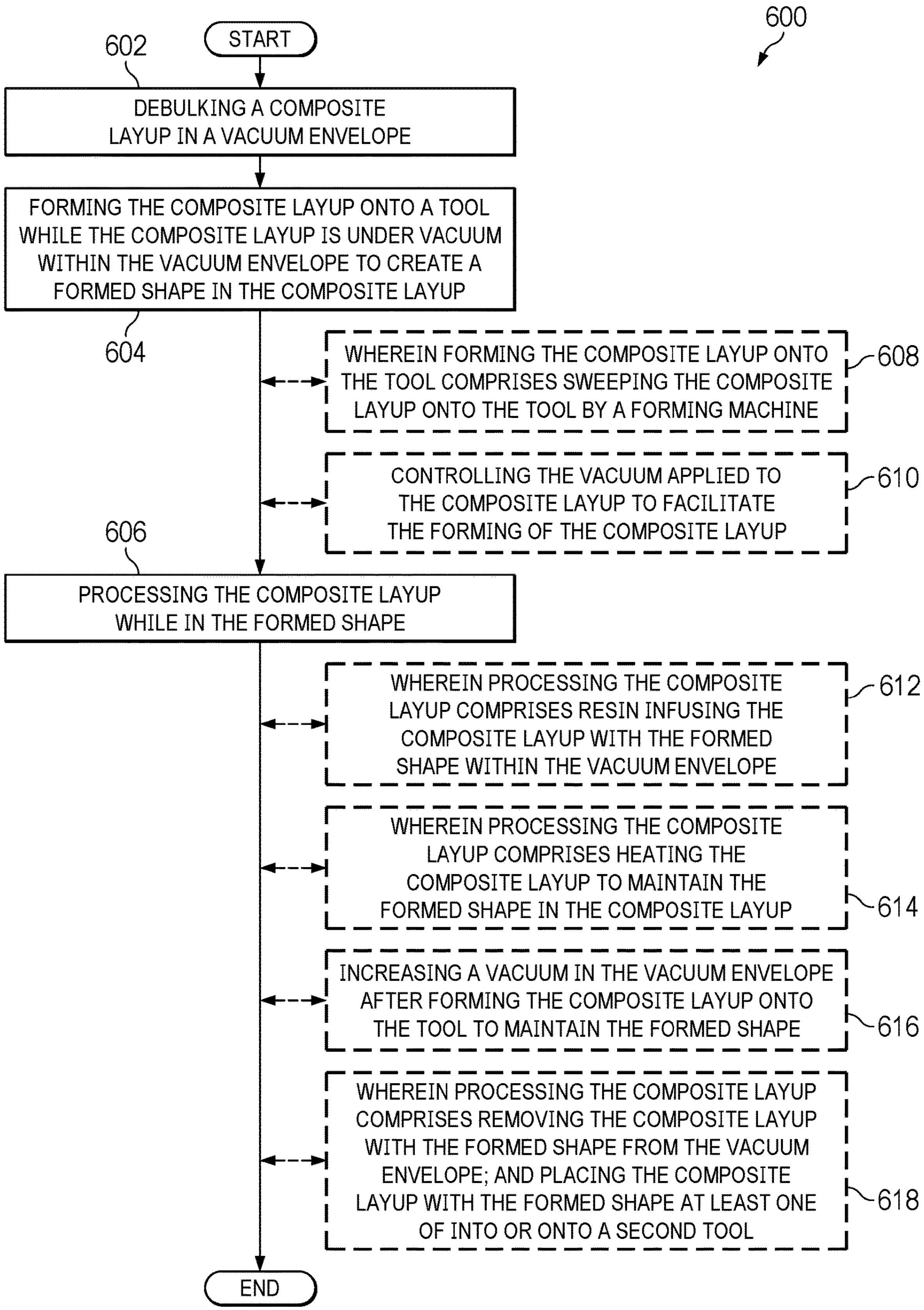
FIG. 6 is a flowchart of a method of forming a composite structure in accordance with an illustrative embodiment.

Turning now to FIG. 6, a flowchart of a method of forming a composite structure is depicted in accordance with an illustrative embodiment. Method 600 can be performed to create a composite component of aircraft 100. Method 600 can be performed on composite layup 202 in vacuum envelope 208 of FIG. 2. Method 600 can be a method comprising steps of flowchart 300 of FIG. 3. Method 600 can be performed using forming machine 402 of FIG. 4.

Method 600 debulks a composite layup in a vacuum envelope (operation 602). Method 600 forms the composite layup onto a tool while the composite layup is under vacuum within the vacuum envelope to create a formed shape in the composite layup (operation 604). Method 600 processes the composite layup while in the formed shape (operation 606). Afterwards, method 600 terminates.

In some illustrative examples, forming the composite layup onto the tool comprises sweeping the composite layup onto the tool by a forming machine (operation 608). The forming machine can comprise any desirable type of sweepers to perform the sweeping. In some illustrative examples, the sweepers of the forming machine comprise at least one of inflatable bladders or compliant wipers. In some illustrative examples, compliant wipers comprise squeegees, fingers, or any other desirable type of sweeper.

In some illustrative examples, method 600 controls the vacuum applied to the composite layup to facilitate the forming of the composite layup (operation 610). By controlling the level of vacuum in the vacuum envelope, stiffness of composite layup in the vacuum envelope can be controlled. By increasing vacuum, stiffness of composite layup in the vacuum envelope can be increased. By decreasing vacuum, stiffness of composite layup in the vacuum envelope can be decreased. In some illustrative examples, vacuum is decreased to decrease stiffness to more easily form composite layup against the tool. In some illustrative examples, reducing stiffness can allow for more slippage of layers of composite layup relative to each other.

In some illustrative examples, processing the composite layup comprises resin infusing the composite layup with the formed shape within the vacuum envelope (operation 612). In some illustrative examples, processing the composite layup comprises heating the composite layup to maintain the formed shape in the composite layup (operation 614). In some illustrative examples, heating the composite layup comprises heating the composite layup while the sweepers hold the composite layup against the tool to maintain a formed shape of the composite layup. In some illustrative examples, heating the composite layup comprises heating the composite layup on the tool using an oven. In some illustrative examples, heating the composite layup melts at least one of a thermoplastic veil or thermoplastic stitching.

In some illustrative examples, method 600 increases a vacuum in the vacuum envelope after forming the composite layup onto the tool to maintain the formed shape (operation 616). Increasing the vacuum in the vacuum envelope increases the stiffness of the composite layup.

In some illustrative examples, processing the composite layup comprises removing the composite layup with the formed shape from the vacuum envelope; and placing the composite layup with the formed shape at least one of into or onto a second tool (operation 618). The second tool can take any desirable form. In some illustrative examples, the second tool can take the form of at least one of a matched metal mold or a mandrel.

Figure 7:
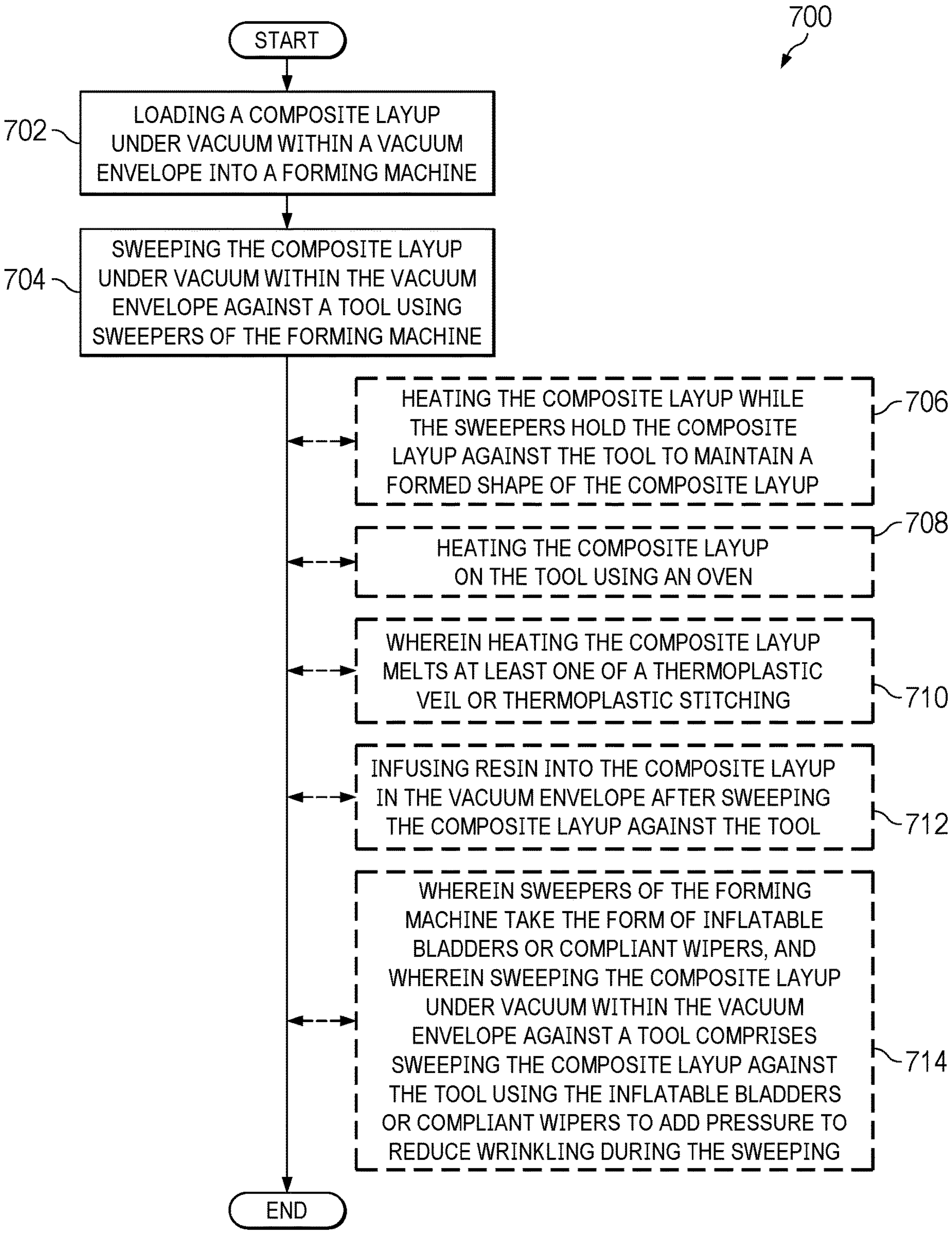
FIG. 7 is a flowchart of a method of forming a composite structure in accordance with an illustrative embodiment.

Turning now to FIG. 7, a flowchart of a method of forming a composite structure is depicted in accordance with an illustrative embodiment. Method 700 can be performed to create a composite component of aircraft 100. Method 700 can be performed on composite layup 202 in vacuum envelope 208 of FIG. 2. Method 700 can be a method comprising steps of flowchart 300 of FIG. 3. Method 700 can be performed using forming machine 402 of FIG. 4.

Method 700 loads a composite layup under vacuum within a vacuum envelope into a forming machine (operation 702). Method 700 sweeps the composite layup under vacuum within the vacuum envelope against a tool using sweepers of the forming machine (operation 704). Afterwards, method 700 terminates.

In some illustrative examples, method 700 heats the composite layup while the sweepers hold the composite layup against the tool to maintain a formed shape of the composite layup (operation 706). In some illustrative examples, the composite layup is heated by heating elements integral to one of the forming machine or the tool. In some illustrative examples, the composite layup is heated by blowers or other types of heaters movable relative to the forming machine.

In some illustrative examples, method 700 heats the composite layup on the tool using an oven (operation 708). In some illustrative examples, heating the composite layup melts at least one of a thermoplastic veil or thermoplastic stitching (operation 710). In some illustrative examples, melting at least one of thermoplastic veil or thermoplastic stitching holds composite layup together. In some illustrative examples, thermoplastic veil stiffens the composite layup. In some illustrative examples, thermoplastic stitching provides tack and keeps composite layup together.

In some illustrative examples, method 700 infuses resin into the composite layup in the vacuum envelope after sweeping the composite layup against the tool (operation 712). Any desirable equipment can be used to perform the resin infusion. In some illustrative examples, additional tooling or an additional vacuum bag can be placed around the vacuum envelope.

In some illustrative examples, sweepers of the forming machine take the form of inflatable bladders or compliant wipers, and wherein sweeping the composite layup under vacuum within the vacuum envelope against a tool comprises sweeping the composite layup against the tool using the inflatable bladders or compliant wipers to add pressure to reduce wrinkling during the sweeping (operation 714).

Figure 8:
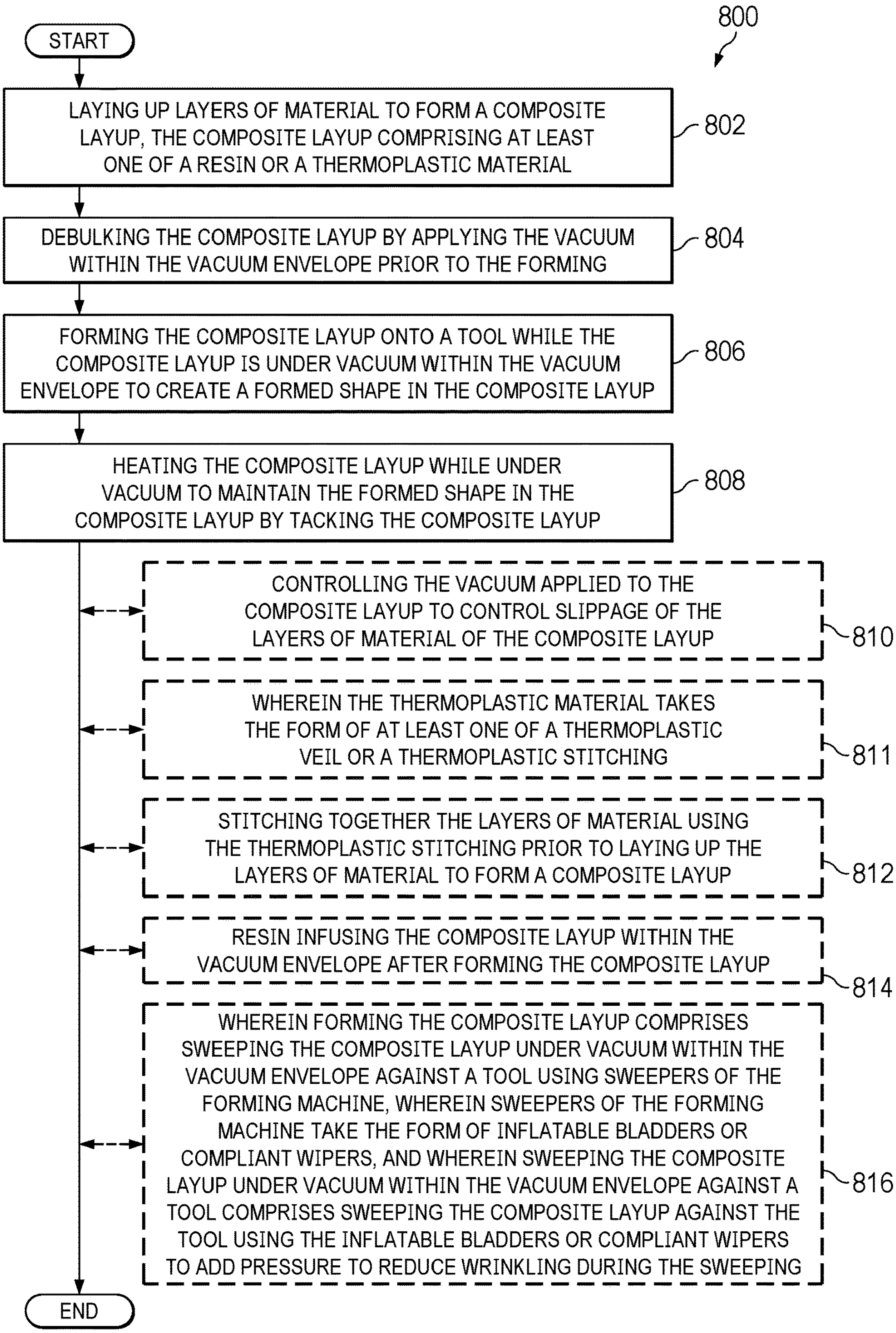
FIG. 8 is a flowchart of a method of forming a composite structure in accordance with an illustrative embodiment.

Turning now to FIG. 8, a flowchart of a method of forming a composite structure is depicted in accordance with an illustrative embodiment. Method 800 can be performed to create a composite component of aircraft 100. Method 800 can be performed on composite layup 202 in vacuum envelope 208 of FIG. 2. Method 800 can be a method comprising steps of flowchart 300 of FIG. 3. Method 800 can be performed using forming machine 402 of FIG. 4.

Method 800 lays up layers of material to form a composite layup, the composite layup comprising at least one of a resin or a thermoplastic material (operation 802). Method 800 debulks the composite layup by applying the vacuum within the vacuum envelope prior to the forming (operation 804). Method 800 forms the composite layup onto a tool while the composite layup is under vacuum within the vacuum envelope to create a formed shape in the composite layup (operation 806). Method 800 heats the composite layup while under vacuum to maintain the formed shape in the composite layup by tacking the composite layup (operation 808). Afterwards, method 800 terminates.

In some illustrative examples, method 800 controls the vacuum applied to the composite layup to control slippage of the layers of material of the composite layup (operation 810). In some illustrative examples, the vacuum applied to the composite layup is decreased to increase the slippage of the layers of material relative to each other during forming of the composite layup.

In some illustrative examples, the thermoplastic material takes the form of at least one of a thermoplastic veil or a thermoplastic stitching (operation 811). In some illustrative examples, method 800 stitches together the layers of material using the thermoplastic stitching prior to laying up the layers of material to form a composite layup (operation 812). In some illustrative examples, the layers of material are stitched into a number of separate stitched sets. Each stitched set can comprise any desirable number of layers of material.

In some illustrative examples, method 800 resin infuses the composite layup within the vacuum envelope after forming the composite layup (operation 814). In some illustrative examples, the vacuum envelope is vacuum sealed to a tool prior to resin infusing the composite layup.

In some illustrative examples, forming the composite layup comprises sweeping the composite layup under vacuum within the vacuum envelope against a tool using sweepers of the forming machine, wherein sweepers of the forming machine take the form of inflatable bladders or compliant wipers, and wherein sweeping the composite layup under vacuum within the vacuum envelope against a tool comprises sweeping the composite layup against the tool using the inflatable bladders or compliant wipers to add pressure to reduce wrinkling during the sweeping (operation 816). In some illustrative examples, the pressure within the inflatable bladders of the forming machine can be greater than present in the inflatable bladders when forming the composite layup under vacuum than forming composite prepreg that is not under vacuum.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C, or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 506 through operation 528 may be optional. For example, operation 608 through operation 620 may be optional. For example, operation 706 through operation 712 may be optional. For example, operation 810 through operation 816 may be optional.

Figure 9:
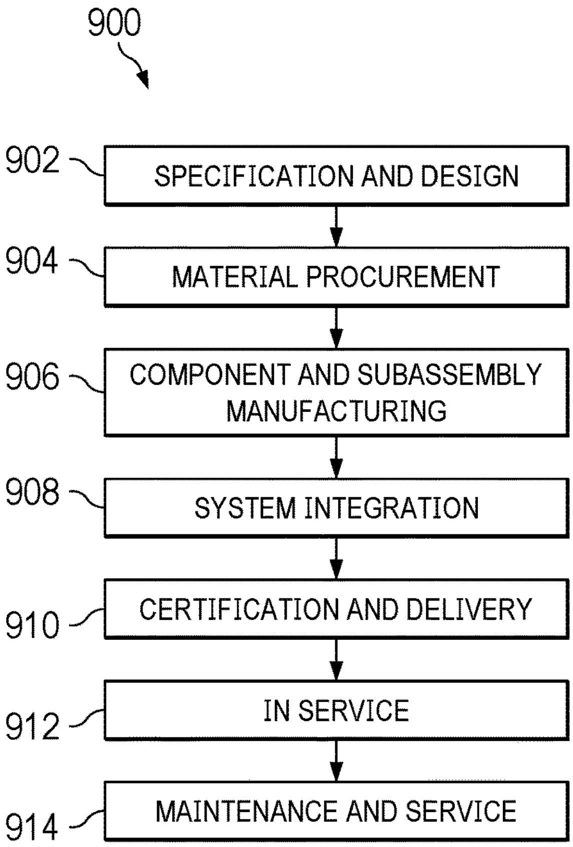
FIG. 9 is an illustration of an aircraft manufacturing and service method in a form of a block diagram in accordance with an illustrative embodiment.
Figure 10:
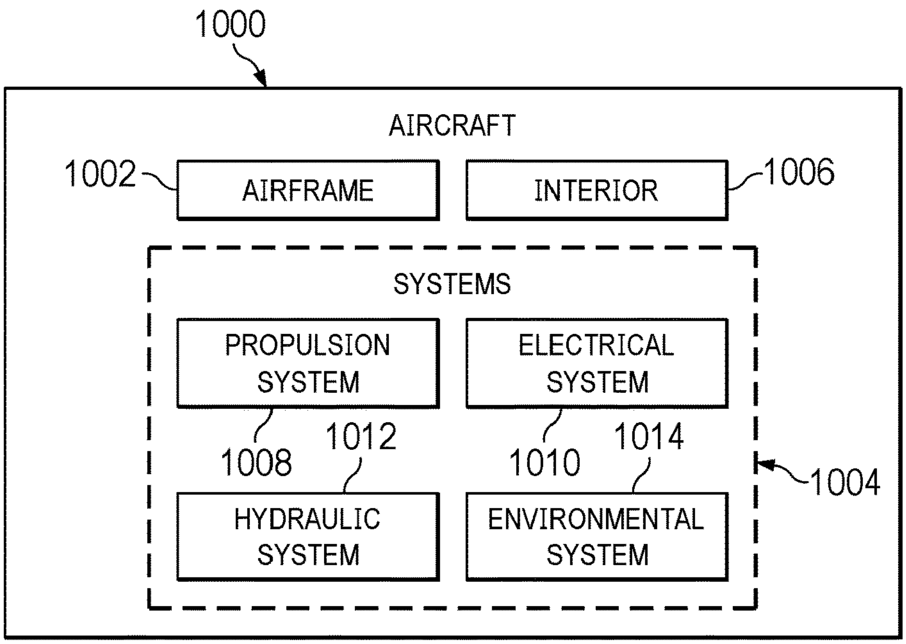
FIG. 10 is an illustration of an aircraft in a form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method in a form of a block diagram is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance and service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft in a form of a block diagram is depicted in which an illustrative embodiment may be implemented. In this example, aircraft 1000 is produced by aircraft manufacturing and service method 900 of FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included.

Apparatuses and methods embodied herein may be employed during at least one of the stages of aircraft manufacturing and service method 900. One or more illustrative embodiments may be manufactured or used during at least one of component and subassembly manufacturing 906, system integration 908, in service 912, or maintenance and service 914 of FIG. 9.

The illustrative examples utilize forming under vacuum in a new process for dry material. A vacuum bag is used to remove bulk from the composite layup, such as a dry laminate. The composite layup is formed against a tool. In some illustrative examples, the composite layup can be formed using a forming machine. In some illustrative examples, the forming machine can use inflatable bladders to add pressure to reduce wrinkling and further control bulk.

The illustrative examples control wrinkle and bulk behavior of a composite material for forming methods. The illustrative examples control wrinkle and bulk behavior during subsequent operations following forming the composite layup to a mandrel under vacuum. For example, the illustrative examples control wrinkle and bulk behavior during subsequent operations with closed mold tooling approaches as well. For closed mold tooling, bulk can be tightly controlled to allow for the tool to close and prevent or reduce inconsistencies.

In the illustrative examples, a vacuum bag enclosing the composite layup is used along with sweepers that apply pressure to achieve elevated pressures beyond vacuum pressure. In some illustrative examples, the forming pressure is applied by inflatable bladders in a forming machine. In some illustrative examples, integrated heating during forming is used to further assist with bulk control. In other illustrative examples, heat can be applied to the composite layup following forming. Elevated pressure during forming is used to control wrinkles and bulk. Temperature control can be used to tack the material at least one of during or following forming and subsequently reduce bulk.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a composite structure, the method comprising:

sealing a composite layup in a vacuum envelope, the composite layup comprising layers of dry fabric retained by a at least one of a resin or a thermoplastic veil or a thermoplastic stitching material;

placing the composite layup in the vacuum envelope onto a tool;

producing a desired stiffness of the composite layup by applying a selected level of a vacuum while forming the composite layup onto the tool while the composite layup is held under the vacuum in the vacuum envelope to create and creating a formed shape comprising the desired stiffness in the composite layup; and subsequently, maintaining the formed shape on the tool by increasing the selected level of vacuum in the vacuum envelope.

2. The method of claim 1, further comprising adjusting slippage between the layers of dry fabric by changing a level of vacuum in the vacuum envelope during the forming of the composite layup onto the tool.

3. The method of claim 1, further comprising heating the composite layup while under the vacuum to maintain the formed shape in the composite layup.

4. The method of claim 3, wherein heating the composite layup comprises melting at least one of the thermoplastic veil or the thermoplastic stitching in the composite layup.

5. The method of claim 3, wherein heating the composite layup comprises heating the composite layup on the tool in an oven.

6. The method of claim 3, wherein heating the composite layup comprises applying directed heat onto the composite layup while sweepers of a forming machine compress the composite layup against the tool.

7. The method of claim 1, further comprising sealing the vacuum envelope against the tool; and infusing resin into the composite layup while the vacuum envelope is sealed against the tool.

8. The method of claim 1, further comprising loading the composite layup sealed in the vacuum envelope into a forming machine, wherein forming the composite layup onto the tool is performed by sweeping the composite layup onto the tool by the forming machine.

9. The method of claim 1, further comprising resin infusing the composite layup within the vacuum envelope.

10. The method of claim 1, further comprising debulking the composite layup prior to the forming by applying the vacuum within the vacuum envelope prior to the forming.

11. The method of claim 1, further comprising removing the composite layup with the formed shape from the vacuum envelope; and placing the composite layup with the formed shape at least one of into or onto a matched metal mold.

12. A method of shaping a composite layup with reduced wrinkles, the method comprising:

debulking a composite layup comprising layers of dry fabric in a vacuum envelope;

placing the composite layup in the vacuum envelope onto a tool;

producing a desired stiffness of the composite layup by applying a selected level of a vacuum while forming the composite layup onto the tool while the composite layup is under the vacuum within the vacuum envelope to create a formed shape in the composite layup;

processing the composite layup while in the formed shape on the tool; and subsequently, maintaining the formed shape on the tool by increasing the selected level of vacuum in the vacuum envelope.

13. The method of claim 12, wherein processing the composite layup comprises resin infusing the composite layup with the formed shape within the vacuum envelope.

14. The method of claim 12, wherein forming the composite layup onto the tool comprises sweeping the composite layup onto the tool by a forming machine.

15. The method of claim 12, wherein processing the composite layup comprises heating the composite layup to maintain the formed shape in the composite layup.

16. The method of claim 12, further comprising increasing a level of slippage between the layers of dry fabric by decreasing the level of the vacuum in the vacuum envelope while forming the composite layup onto the tool.

17. The method of claim 12, wherein processing the composite layup comprises:

removing the composite layup with the formed shape from the vacuum envelope; and placing the composite layup with the formed shape at least one of into or onto a second tool.

18. A method of forming a composite layup, the method comprising:

loading a composite layup comprising layers of dry fabric retained by at least one of a thermoplastic veil or a thermoplastic stitching under a vacuum within a vacuum envelope into a forming machine;

placing the composite layup in the vacuum envelope onto a tool;

producing a desired stiffness of the composite layup by applying a selected level of the vacuum while forming the composite layup;

sweeping the composite layup under vacuum within the vacuum envelope against the tool using sweepers of the forming machine;

increasing the vacuum in the vacuum envelope after forming the composite layup onto the tool to maintain a formed shape; and subsequently, maintaining the formed shape on the tool by increasing the selected level of vacuum in the vacuum envelope.

19. The method of claim 18, further comprising placing the composite layup with the formed shape at least one of into or onto a matched metal mold; and heating the composite layup while the sweepers hold the composite layup against the tool to maintain a formed shape of the composite layup.

20. The method of claim 18, wherein heating the composite layup melts at least one of the thermoplastic veil or the thermoplastic stitching restraining the composite layup.

21. The method of claim 18, wherein sweepers of the forming machine comprise inflatable bladders or compliant wipers, and wherein sweeping the composite layup under vacuum within the vacuum envelope against a tool comprises sweeping the composite layup against the tool using the inflatable bladders or compliant wipers to add pressure to reduce wrinkling during the sweeping.

22. A method of forming a composite layup, the method comprising:

laying up layers of dry fabric material to form a composite layup, the composite layup comprising restrained by at least one of a resin or a thermoplastic veil or a thermoplastic stitching material;

debulking the composite layup by applying vacuum within a vacuum envelope prior to the forming;

placing the composite layup in the vacuum envelope onto a tool;

producing a desired stiffness of the composite layup by applying a selected level of vacuum while forming the composite layup onto the tool while the composite layup is under the vacuum within the vacuum envelope to create a formed shape in the composite layup;

heating the composite layup while under vacuum to maintain the formed shape in the composite layup by tacking the composite layup; and subsequently, maintaining the formed shape on the tool by increasing the selected level of vacuum in the vacuum envelope.

23. The method of claim 22, further comprising adjusting the vacuum applied to the composite layup while forming the composite layup to adjust slippage of the layers of dry fabric material of the composite layup.

24. The method of claim 22, further comprising resin infusing the composite layup within the vacuum envelope after forming the composite layup.

25. The method of claim 22, further comprising melting the at least one of the thermoplastic veil or the thermoplastic stitching.

* * * * *